(12) United States Patent
Chiu et al.

(10) Patent No.: US 6,604,830 B1
(45) Date of Patent: Aug. 12, 2003

(54) COLOR WHEEL

(75) Inventors: Hsien-Chi Chiu, Hsinchu (TW); Lang-Fu Tsai, Hsinchu (TW); Hsien-Chang Chen, Hsinchu (TW)

(73) Assignee: Young Optics Inc., Hsin-Chu (TW)

( * ) Notice: Subject to any disclaimer, the term of this patent is extended or adjusted under 35 U.S.C. 154(b) by 0 days.

(21) Appl. No.: 10/064,502

(22) Filed: Jul. 23, 2002

(30) Foreign Application Priority Data

May 15, 2002 (TW) ........................................ 91207167 U

(51) Int. Cl.⁷ ............................................. G03B 21/14
(52) U.S. Cl. ........................... 353/84; 348/743; 359/889
(58) Field of Search ..................... 353/31, 84; 359/889, 359/892; 348/743

(56) References Cited

U.S. PATENT DOCUMENTS

| | | | | |
|---|---|---|---|---|
| 3,982,825 A | * | 9/1976 | Mitchell | 359/887 |
| 4,800,474 A | * | 1/1989 | Bornhorst | 362/293 |
| 5,777,694 A | * | 7/1998 | Poradish | 348/743 |
| 5,868,482 A | * | 2/1999 | Edlinger et al. | 353/84 |
| 5,921,650 A | * | 7/1999 | Doany et al. | 353/31 |
| 6,024,453 A | * | 2/2000 | Edlinger et al. | 353/84 |

* cited by examiner

Primary Examiner—Russell Adams
Assistant Examiner—Michael Dalakis
(74) Attorney, Agent, or Firm—Winston Hsu

(57) ABSTRACT

A color wheel comprises a motor, a plurality of filter segments and an obstructing plate. The motor has a rotating casing. Protruding from the center of an upper side of the rotating casing, there is a rotating shaft. One end of each fan-shaped filter segment is in contact with the rotating shaft, and one side of its lower surface has a formation of a glue area to be glued onto an upper side of the motor, forming a rear clearance from the upper side. The filter segments are joined to each other to become a ring shape surrounding the rotating shaft. A center hole of the ring-shaped obstructing plate is mounted on the rotating shaft, keeping a clearance from the filter segment. On the outside of the obstructing plate is a ring recess. The invention provides ways of heat insulation and radiation for the filter segments, to enhance product quality.

1 Claim, 3 Drawing Sheets

COLOR WHEEL

BACKGROUND OF INVENTION (a) Field of the invention

The invention relates to a color wheel with periodic color changes of light beam, and particularly to a color wheel producing original colors of light in a projection display device.

(b) Description of the Prior Art

In order to create color contrast in a projection display device, a color wheel is installed on the optical light path of a projection display device. Filter segments of various colors are installed on the periphery of the color wheel and are rotated around the central axis of the color wheel. By rotating filter segments on the color wheel, the filter segments are alternately inserted into the optical path and thereby the desired periodic color change is produced. Then the projection display device can adjust color contrast in coordination with light valve action.

FIG. 1 is a color wheel disclosed in U.S. Pat. No. 5,868,482. On a shaft 11 of a motor 10, a holding device 12 is used for fixing a carrier 13. On an outer edge area of the carrier 13, there is a recess 18 with a balancing device that serves to compensate imbalances during high speed rotation of the color wheel. On an inside edge area of the carrier 13, there is a ring recess 14 filled with adhesive. An adhesive film 16 on one end of each filter segments 15 is bonded to the ring recess 14 and can be accurately positioned radially and axially against the stop 19 on the inside edge area of the carrier 13. Therefore, the filter segments 15 form a continuous ring. A ring 17 that covers the ring recess 14 is mounted to the stop 19 for fastening the filter segments 15 to construct a color wheel. As a result, the color wheel moves the ring recess 14 away from the light beam projecting path to avoid deterioration of adhesive due to the heat of light.

However, because of consumer demand for lightness, thinness, shortness and smallness, projection display devices have been miniaturized, so is the color wheel becoming smaller and smaller. Therefore, when high temperature light beam impinges on the downsized filter segments 15, heat is rapidly conducted to the bonding ends of the filter segments 15 that are sealed on both sides and heat cannot be radiated resulting in rising temperature, so the adhesive becomes deteriorated because of the high temperature. Meanwhile, because one end of the filter segment 15 is coated with adhesive film 16 only on its one side to bond to the carrier 13, and the carrier 13 is subjected to projection of stray and deviated light caused by noises or alignment tolerances, resulting in rising temperature on the metal carrier 13 consequently to deterioration of the adhesive. Furthermore, another side of the filter segments 15 is in direct contact with the ring 17, and the adhesive has poor heat conduction much different than the heat conduction coefficient of the ring 17, so there is a temperature difference between two sides of the bonding end of filter segments 15, resulting in a thermal stress that causes the filter segments 15 to crack during high speed rotation. As a result, these defects degrade the quality of the product.

SUMMARY OF INVENTION

The objective of the invention is to provide a color wheel, by changing the position and size of a glued side of filter segment, and providing proper heat diffusing paths for the glued side, to prevent thermal stress and upgrade product quality.

Another objective of the invention is to provide a color wheel to avoid deterioration to the glue and upgrade product reliability by obstructing direct projection of light onto the glue and reserving clearances for heat insulation and diffuseness.

To achieve the above objectives, the invention has a motor with a rotating casing. Protruding from a center of an upper side of the rotating casing, there is a rotating shaft. One end of each fan-shaped filter segment is in contact with the rotating shaft, while one side of its lower surface is a formation of a glue area coated with glue, being glued onto the upper side of the motor, forming a rear clearance from the upper side, the sides of filter segments are joined to become a ring shape around the rotating shaft. The ring-shaped obstructing plate has a center hole that is mounted onto the rotating shaft, keeping a clearance from the filter segments, and there is a ring recess on the outside of the obstructing plate.

DETAILED DESCRIPTION

The technical approach and other functions of the present invention to achieve the above objectives are described with the following drawings.

Figure 1:
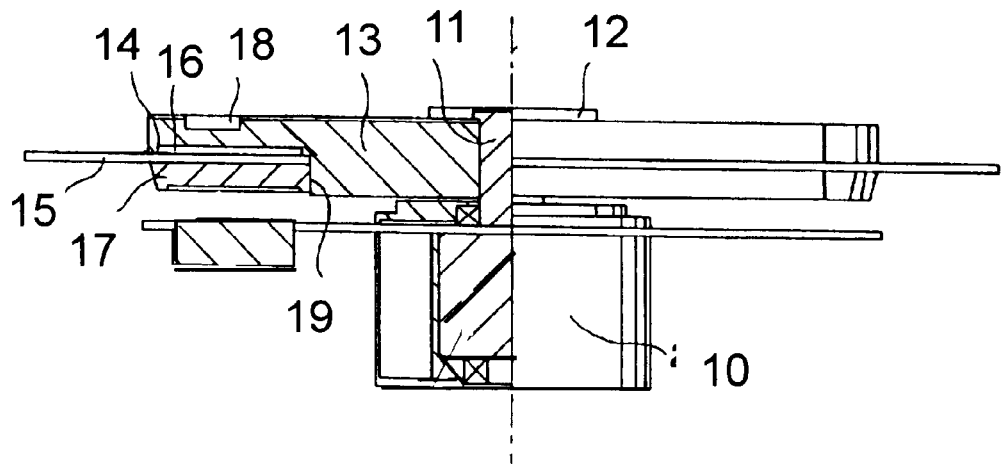
FIG. 1 is a section view of a color wheel disclosed in U.S. Pat. No. 5,868,482.
Figure 2:
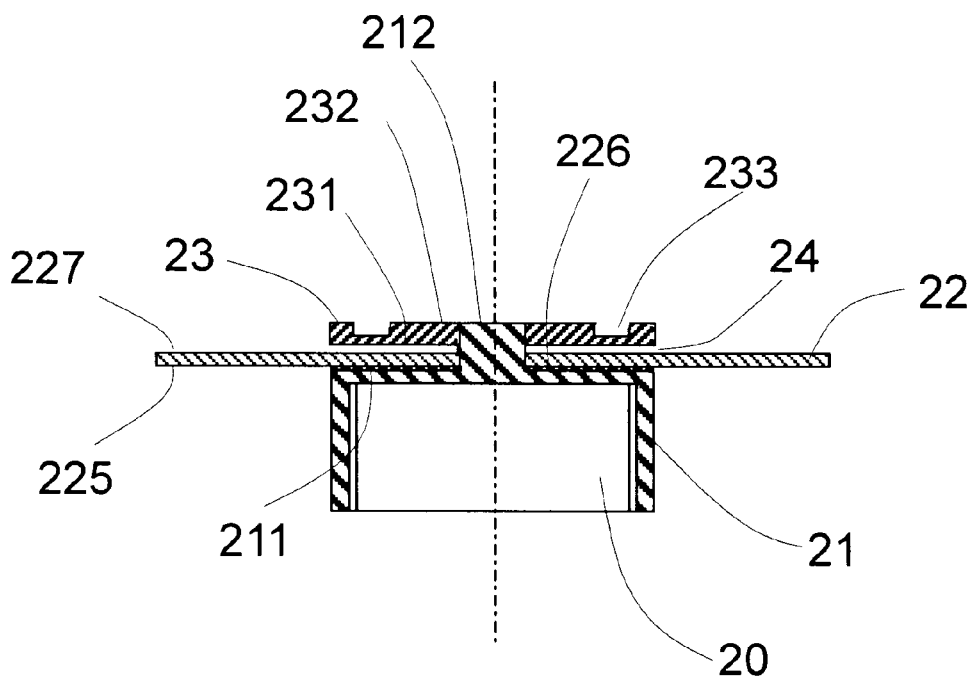
FIG. 2 is a section view of a first preferred embodiment of the present invention of color wheel.
Figure 3:
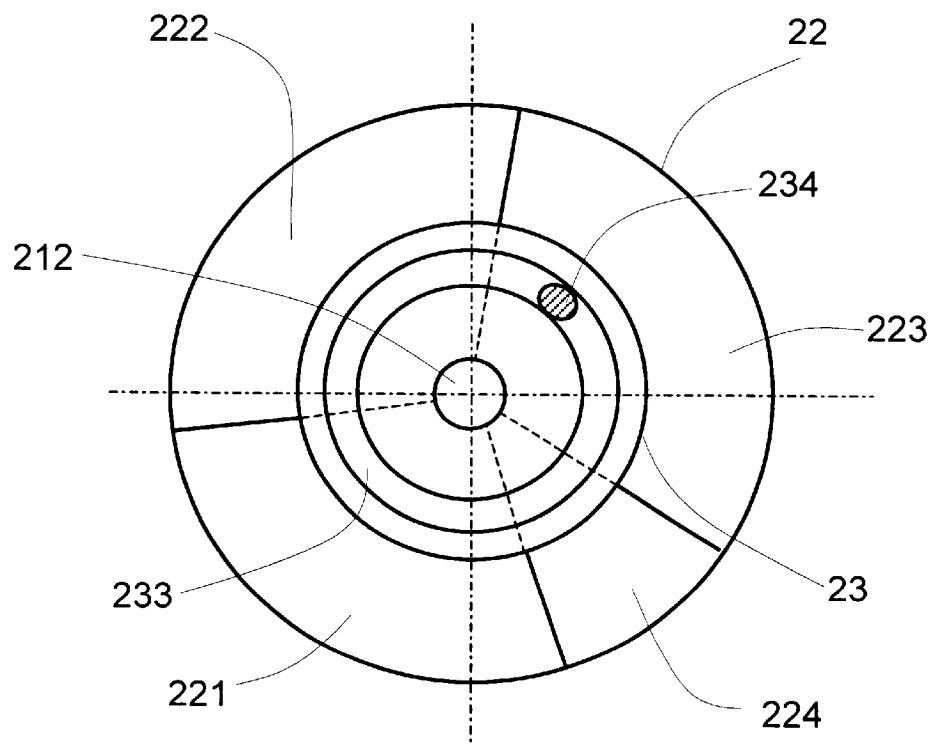
FIG. 3 is a top view of the first preferred embodiment of the present invention of color wheel.

Please refer to FIGS. 2 and 3 that illustrate a first preferred embodiment of the present invention of color wheel comprising a motor 20, a plurality of filter segment 22 and an obstructing plate 23. Wherein, the motor 20 has a rotating casing 21, and a rotating shaft 212 protrudes from a center of an upper side 211 of the rotating casing 21 Each of filter segments 22 is a fan-shaped section in a different color, including a red filter segment 221, a green filter segment 222, a blue filter segment 223 and a white filter segment 224. One end of the filter segment 22 is in contact with the rotating shaft 212, a glue area 226 on a lower surface 225 of the filter segments 22 is glued to an upper side 211 of the rotating casing 21. The filter segments 22 are joined to each other to become a ring surrounding the rotating shaft 212. The obstructing plate, also ring-shaped, has an outer diameter approximately equal to an outer diameter of the rotating casing 21. A center hole of the obstructing plate 23 is inserted by the rotating shaft 212 to form a clearance 24 between an inner side 231 of the obstructing plate 23 and an upper surface 227 of the filter segment 22. There is a ring recess 233 on an outer side 232 of the obstructing plate 23, and a counterweight 234 is installed at a specified place in the ring recess233 for reducing vibration when the color wheel is rotating.

In the first preferred embodiment of the invention of color wheel, the filter segment 22 is glued to the rotating casing 21 of the motor 20 for avoiding directly in contact with the obstructing plate 23 and reducing heat transmitted directly from the obstructing plate 23, and the obstructing plate 23 outside the filter segment 22, having an outer diameter larger than or equal to the glue area 226, obstructs stray light beams or deviated light, and avoids the light beam's direct projection on the glue that may become deteriorated. Meanwhile, a clearance 24 between the obstructing plate 23 and the filter segment 22 serves to insulate heat transmission from the obstructing plate 23, and avoid deterioration of the glue due to high temperature. Furthermore, when the high temperature resulting from light beams projected on the filter segment 22 transfers to the glue area 226, air flow driven by the filter segment 22 rotating at high speed is brought into the clearance 24, and thereby the portion of the filter segment 22 on the glue area 226 can be cooled, so the whole filter segment 22 has more uniform temperature distribution to reduce thermal stress, avoid cracking of the filter segment 22 and enhance the reliability of color wheel.

Figure 4:
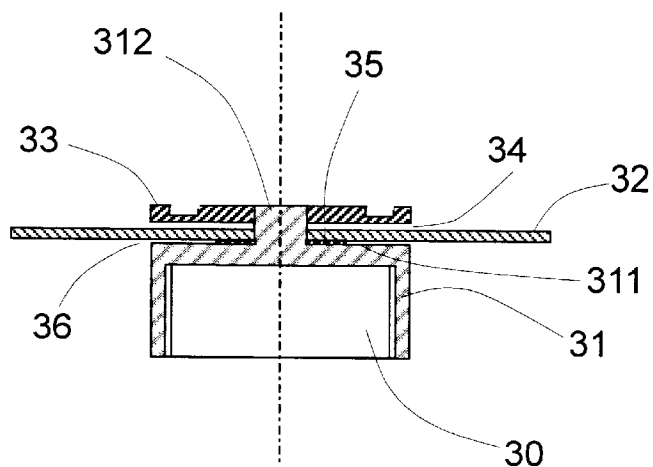
FIG. 4 is a section view of a second preferred embodiment of the present invention of color wheel.

FIG. 4 illustrates a second embodiment of the invention of color wheel having a main structure that is similar to the first embodiment of color wheel. The second embodiment comprises a motor 30 with a rotating casing 31, a rotating shaft 312 protruding from an upper side 311 of the rotating casing 31, fan-shaped sections of filter segments 32 being glued to the upper side 311 to become a ring surrounding the rotating shaft 312, and a ring-shaped obstructing plate 33 having a center hole inserted by the rotating shaft 312 with spacing a clearance 34 away from the filter segments 32. The second embodiment has different features from the first embodiment, including the following: the filter segments 32 being glued on an upper side 311 form a glue area 35 and the outer diameter of the glue are 35 is reduced to a specified area enough to fix the filter segments 32 for forming a specified rear clearance 36 between the filter segments 32 and the upper side 311, so that two sides of the filter segments 32 almost have same heat radiating conditions.

Hence, the filter segments 32 have more uniform temperature distribution to reduce thermal stress and avoid destruction to the filter segments 32.

Figure 5:
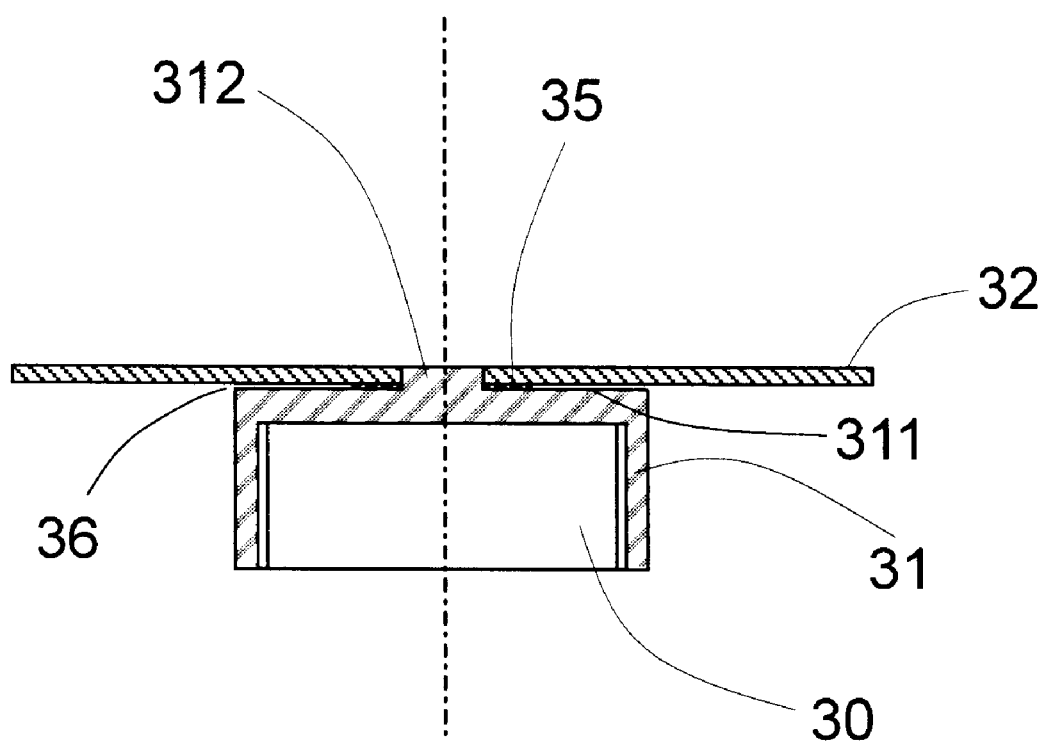
FIG. 5 is a sectional view of another preferred embodiment of the present invention of color wheel.

By reducing the glue area 35 in the second embodiment, stray or deviated light beams directly impinging on the glue area 35 is also reduced. Therefore, as in another preferred embodiment of the invention shown in FIG. 5, the obstructing plate 33 is absent, so that the outside of the filter segments 32 in directly contact with the air flow driven by the rotating motor 30 can have better radiating effects, and the heat from direct projection will be offset. As a result, the color wheel can eliminate the component of obstructing plate, and reduce the cost.

It is to be understood that the above description covering some of the preferred embodiments of the present invention shall not be based to restrict or limit the range of applicability of the present invention, and that all modifications or variations made without departing from the spirit of the invention shall be included in the subject claim.

What is claimed is:

1. A color wheel comprising:

a motor, having a rotating casing with an upper side; and at least one filter segment, having a glue area on one side of a lower surface, which the glue area is glued to the upper side of the rotating casing;

wherein the outer diameter of the glue area is smaller than the outer diameter of the upper side of the rotating casing to form a rear clearance between the upper side and the filter segment.

* * * * *